US012123420B2

(12) United States Patent
Kabasawa et al.

(10) Patent No.: US 12,123,420 B2
(45) Date of Patent: Oct. 22, 2024

(54) VACUUM PUMP AND STATOR COLUMN

(71) Applicant: Edwards Japan Limited, Chiba (JP)

(72) Inventors: Takashi Kabasawa, Chiba (JP); Yasushi Tateno, Chiba (JP); Yohei Ogawa, Chiba (JP)

(73) Assignee: Edwards Japan Limited, Chiba (JP)

( * ) Notice: Subject to any disclaimer, the term of this patent is extended or adjusted under 35 U.S.C. 154(b) by 91 days.

(21) Appl. No.: 17/793,128

(22) PCT Filed: Jan. 20, 2021

(86) PCT No.: PCT/JP2021/001916
§ 371 (c)(1),
(2) Date: Jul. 15, 2022

(87) PCT Pub. No.: WO2021/149742
PCT Pub. Date: Jul. 29, 2021

(65) Prior Publication Data
US 2023/0049439 A1 Feb. 16, 2023

(30) Foreign Application Priority Data
Jan. 24, 2020 (JP) ................................ 2020-010263

(51) Int. Cl.
*F04D 19/04* (2006.01)
*F04D 27/00* (2006.01)
*F04D 29/08* (2006.01)

(52) U.S. Cl.
CPC ......... *F04D 19/042* (2013.01); *F04D 27/001* (2013.01); *F04D 29/083* (2013.01); *F05D 2210/12* (2013.01)

(58) Field of Classification Search
CPC .... F04B 19/042; F04B 27/001; F04B 29/083; F05D 2210/12

(Continued)

(56) References Cited

U.S. PATENT DOCUMENTS

2003/0129053 A1* 7/2003 Nonaka ................. F04D 29/584 415/90
2011/0200460 A1* 8/2011 Nonaka ................. F04D 27/001 417/63
2019/0040866 A1* 2/2019 Hofmann .............. F16C 17/045

FOREIGN PATENT DOCUMENTS

JP 2000120580 A * 4/2000
JP 2011007049 A 1/2011

(Continued)

OTHER PUBLICATIONS

Translation of JP 2000-120580 (Year: 2023).*

(Continued)

*Primary Examiner* — Philip E Stimpert
(74) *Attorney, Agent, or Firm* — Theodore M. Magee; Westman, Champlin & Koehler, P.A.

(57) ABSTRACT

A vacuum pump and a stator column wherein partition walls from an outer peripheral surface of the stator column toward an inner periphery of a rotor blade are provided at two spots, and a groove-shaped channel in a circumferential direction is provided. A sectional area of the channel changes in the circumferential direction. As a result, the pressure difference between a front and a rear of the partition wall on a downstream side is made uniform regardless of a location, and a flowrate of the gas passing through a gap between the partition wall on the downstream side and the inner peripheral surface of the rotor blade is made uniform regardless of the location. The change in the sectional area is achieved either by changing a depth of the groove-shaped channel or by changing an interval between the partition walls at the two spots.

7 Claims, 7 Drawing Sheets

(58) Field of Classification Search
USPC ....................................................... 417/423.4
See application file for complete search history.

(56) References Cited

FOREIGN PATENT DOCUMENTS

| | | |
|---|---|---|
| JP | 2018150837 A | 9/2018 |
| WO | 2014119191 | 8/2014 |

OTHER PUBLICATIONS

PCT International Search Report dated Apr. 27, 2021 for corresponding PCT application Serial No. PCT/JP2021/001916, 2 pages.
PCT International Written Opinion dated Apr. 27, 2021 for corresponding PCT application Serial No. PCT/JP2021/001916, 4 pages.

* cited by examiner

VACUUM PUMP AND STATOR COLUMN

CROSS-REFERENCE OF RELATED APPLICATION

This application is a Section 371 National Stage Application of International Application No. PCT/JP2021/001916, filed Jan. 20, 2021, which is incorporated by reference in its entirety and published as WO 2021/149742A1 on Jul. 29, 2021 and which claims priority of Japanese Application No. 2020-010263, filed Jan. 24, 2020.

BACKGROUND

The present invention relates to a vacuum pump and a stator column which reduce a difference in a pressure generated in an annular gas exhaust path of a vacuum pump as much as possible.

In a vacuum pump, such an art has been proposed that a temperature sensor is installed in a space formed by an inner peripheral surface of a rotor blade and an outer peripheral surface of a stator column which accommodates a drive motor therein so as to measure a temperature of the rotor blade. It had an object to detect in advance occurrence of a creep phenomenon caused by overheat by accurately measuring the temperature of the rotor blade and to deal with it.

This art had a problem that a process gas exhausted by the vacuum pump enters even to a periphery of the temperature sensor, and if composition of the gas in the periphery of the temperature sensor is changed, measurement accuracy is lowered.

As a measure against it, an invention described in Japanese Patent Application Publication No. 2018-150837 is proposed.

The discussion above is merely provided for general background information and is not intended to be used as an aid in determining the scope of the claimed subject matter. The claimed subject matter is not limited to implementations that solve any or all disadvantages noted in the background.

SUMMARY

In a vacuum pump of a conventional art shown in FIG. 7, a purge gas was introduced from a purge port 18. Then, the purge gas which satisfies either one of conditions, that is, an amount by which a flow velocity of the purge gas is faster than a flow velocity of backflow of an exhaust gas exhausted by the vacuum pump at least on a part of a downstream side from a temperature sensor unit 19 at temperature measurement of the rotor blade and an amount that a pressure of the purge gas becomes an intermediate flow or a viscous flow in a periphery of the temperature sensor unit 19 was supplied to the vacuum pump. By constituting as above, accurate temperature measurement by the temperature sensor unit 19 was aimed at. With this conventional art, a throttle portion was disposed as a purge gas supply mechanism which can adjust a flowrate of the purge gas in the stator column.

However, if a sectional area of the exhaust path is small and resistance is large, a large pressure-difference is generated between a vicinity of an outlet port (vicinity of a phase where the outlet port is provided) and a side opposite thereto ("high pressure", "low pressure" in FIG. 7). As a result, imbalance was caused in the flow of the purge gas between the inner peripheral surface of the rotor blade and the outer peripheral surface of the stator column, and the purge gas did not flow smoothly to the side opposite to the outlet port in some cases.

Thus, there was a problem that, only by causing a sufficient purge gas to flow, the composition of the gas in the periphery of the temperature sensor unit 19 is changed, whereby the measurement accuracy is lowered.

Moreover, such a problem also occurred that, if there is a spot where the flow of the purge gas is poor, the process gas intrudes therein and as a result, products deposit on the rotor blade, for example.

Thus, the present invention has an object to provide a vacuum pump and a stator column which can relax the pressure difference generated in the exhaust path and allow the purge gas to flow as uniformly as possible.

An invention described in claim 1 provides a vacuum pump including a housing in which an outlet port for exhausting a gas is formed, a stator column enclosed in the housing and surrounding various electric components, inside the housing, a rotating shaft rotatably supported, a rotating body fixed to the rotating shaft, disposed outside the stator column and rotating with the rotating shaft, a stator portion disposed opposite to the rotating body with a predetermined gap, and an exhaust mechanism for exhausting a gas by mutual actions of the rotating body which is rotated and the stator portion, characterized in that a first annular gas channel allowing the outlet port and an exit of the exhaust mechanism to communicate with each other is provided, and a pressure-difference relaxing mechanism which relaxes the pressure difference generated in the first annular gas channel is included.

An invention described in claim 2 provides a vacuum pump described in claim 1, characterized in that the pressure-difference relaxing mechanism has a second annular gas channel formed by two partition walls, and a sectional area of the second annular gas channel is formed larger in the vicinity of the outlet port and smaller on an opposite side.

An invention described in claim 3 provides a vacuum pump described in claim 2, characterized in that, by changing a width in a radial direction of the second annular gas channel, the sectional area of the second annular gas channel is formed larger in the vicinity of the outlet port and smaller on an opposite side.

An invention described in claim 4 provides a vacuum pump described in claim 2, characterized in that, by changing a width in a center axis direction of the second annular gas channel, the sectional area of the second annular gas channel is formed larger in the vicinity of the outlet port and smaller on an opposite side.

An invention described in claim 5 provides a vacuum pump described in any one of claims 1 to 4, characterized in that the pressure-difference relaxing mechanism has a plurality of outlet ports from the first annular gas channel provided.

An invention described in claim 6 provides a vacuum pump described in any one of claims 1 to 5, characterized in that the pressure-difference relaxing mechanism has an exit to the first annular gas channel of the exhaust mechanism constituted by a groove extended in a circumferential direction.

An invention described in claim 7 provides a vacuum pump described in any one of claims 1 to 6, characterized in that a partition wall which separates the outlet port side from the exit side of the exhaust mechanism is provided in the first annular gas channel, and a plurality of holes which allow the outlet port side and the exit side of the exhaust mechanism to communicate with each other are provided in the partition wall.

An invention provides a vacuum pump characterized in that, on an upstream side in an exhaust direction of the pressure-difference relaxing mechanism, a temperature sensor is provided on the stator column.

An invention provides a stator column, which is the stator column used in the vacuum pump characterized in that a partition wall forming the second annular gas channel is provided.

According to the present invention, by relaxing the pressure difference generated in the exhaust path of the gas, the gas is allowed to flow uniformly. Thus, since the composition of the gas in the periphery of the temperature sensor is made stable, the temperature of the rotor blade can be measured accurately.

Moreover, deposition of products caused by intrusion of a process gas generated by an imbalanced flow of the gas can be prevented.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DETAILED DESCRIPTION

Preferred embodiments of a vacuum pump and a stator column of the present invention will be described below in detail by referring to FIG. 1 to FIG. 6.

Figure 1:
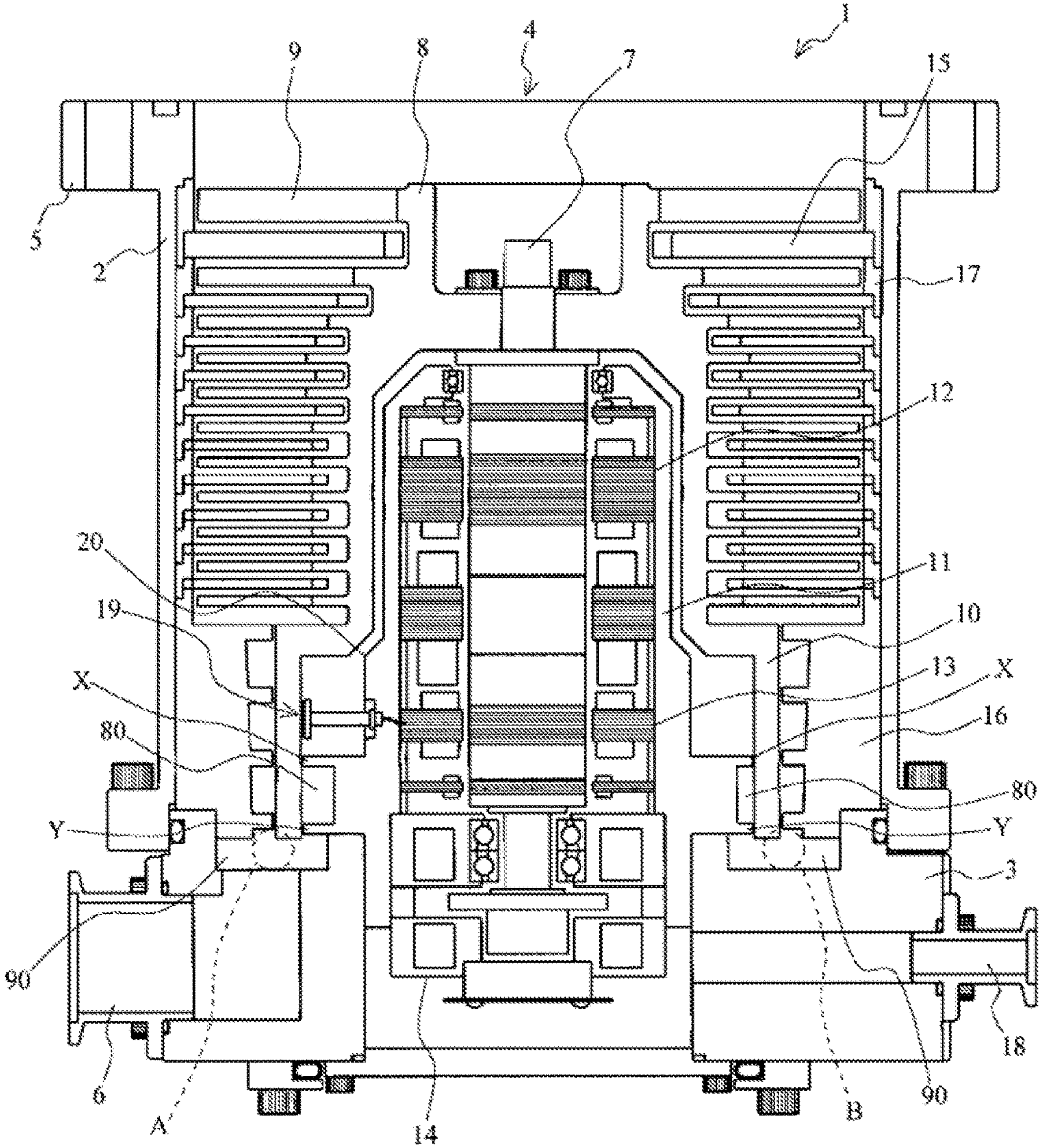
FIG. 1 is a diagram illustrating a schematic configuration example of a vacuum pump according to a first embodiment with a depth of a groove changed of the present invention.
Figure 2:
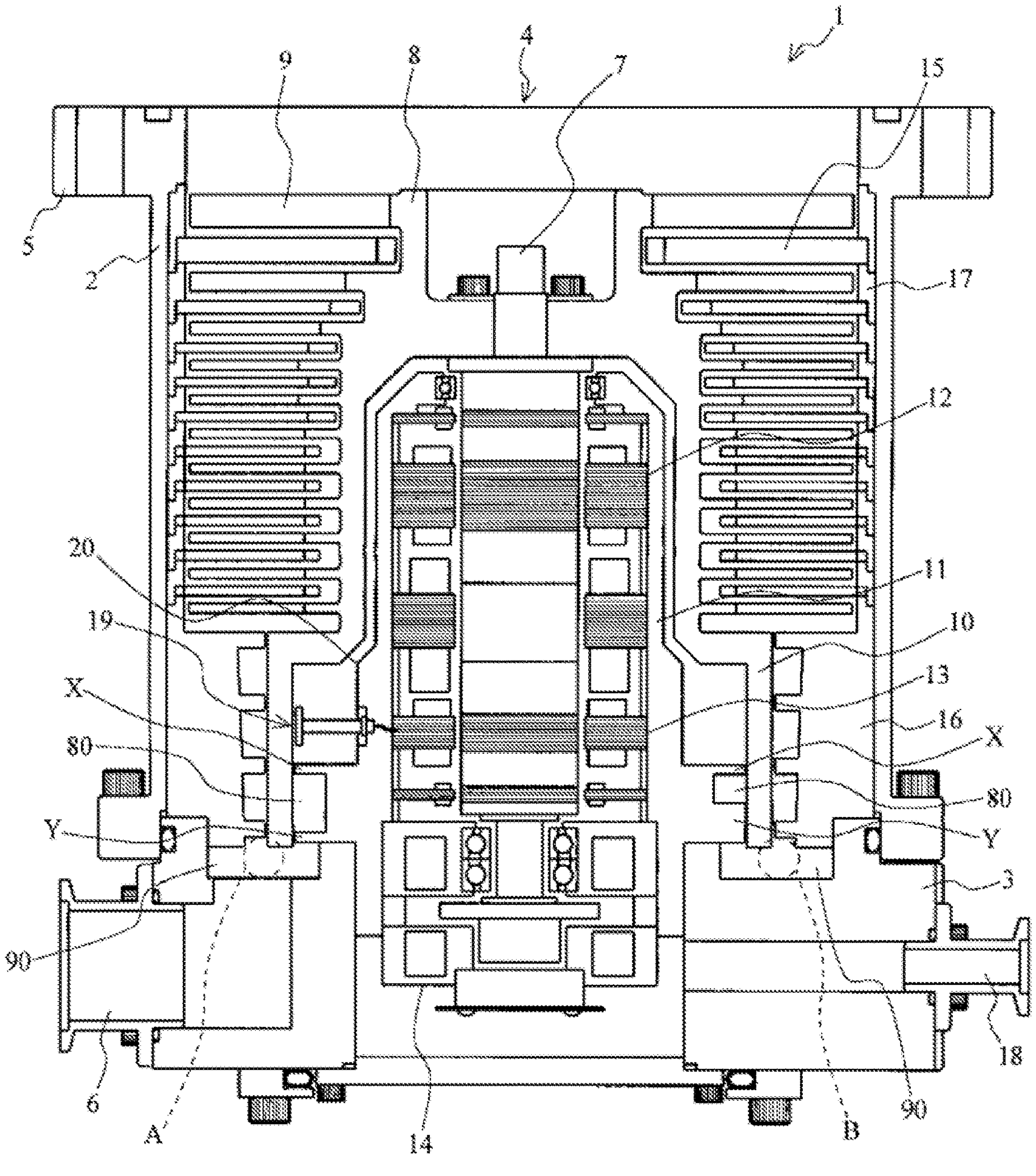
FIG. 2 is a diagram illustrating a schematic configuration example of the vacuum pump according to a second embodiment with a width of the groove changed of the present invention.

(1) Outline of Embodiments (i) As shown in FIG. 1 and FIG. 2, partition walls X, Y are provided at two spots from an outer peripheral surface of a stator column 20 toward an inner periphery of a rotor blade, and a groove-shaped channel in a circumferential direction is provided. A pressure of a gas flowing in the channel is changed by changing a sectional area of the channel in the circumferential direction. As a result, since a pressure difference between a front and a rear of the partition wall on a downstream side can be made uniform regardless of a location, a flowrate of the gas passing through a gap between the partition wall on the downstream side and the inner peripheral surface of the rotor blade can be made uniform regardless of a location.

A method of changing the sectional area includes a method (first embodiment) of changing a depth of the groove-shaped channel shown in FIG. 1 and a method (second embodiment) of changing an interval between the partition walls at the two spots shown in FIG. 2.

Figure 4:
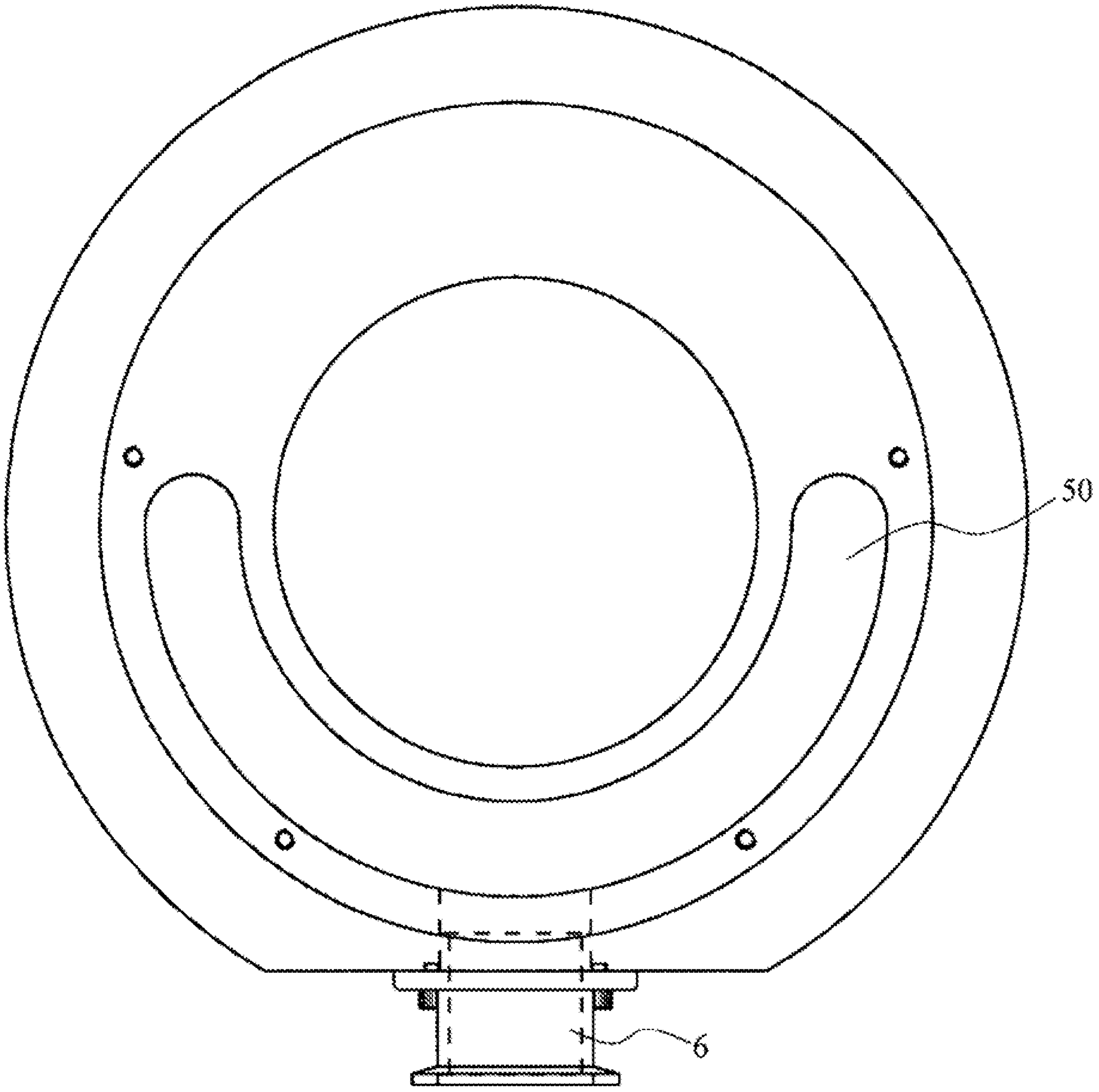
FIG. 4 is a plan view illustrating the vacuum pump (before a lid is installed) according to the embodiment with an exhaust path improved of the present invention.
Figure 5:
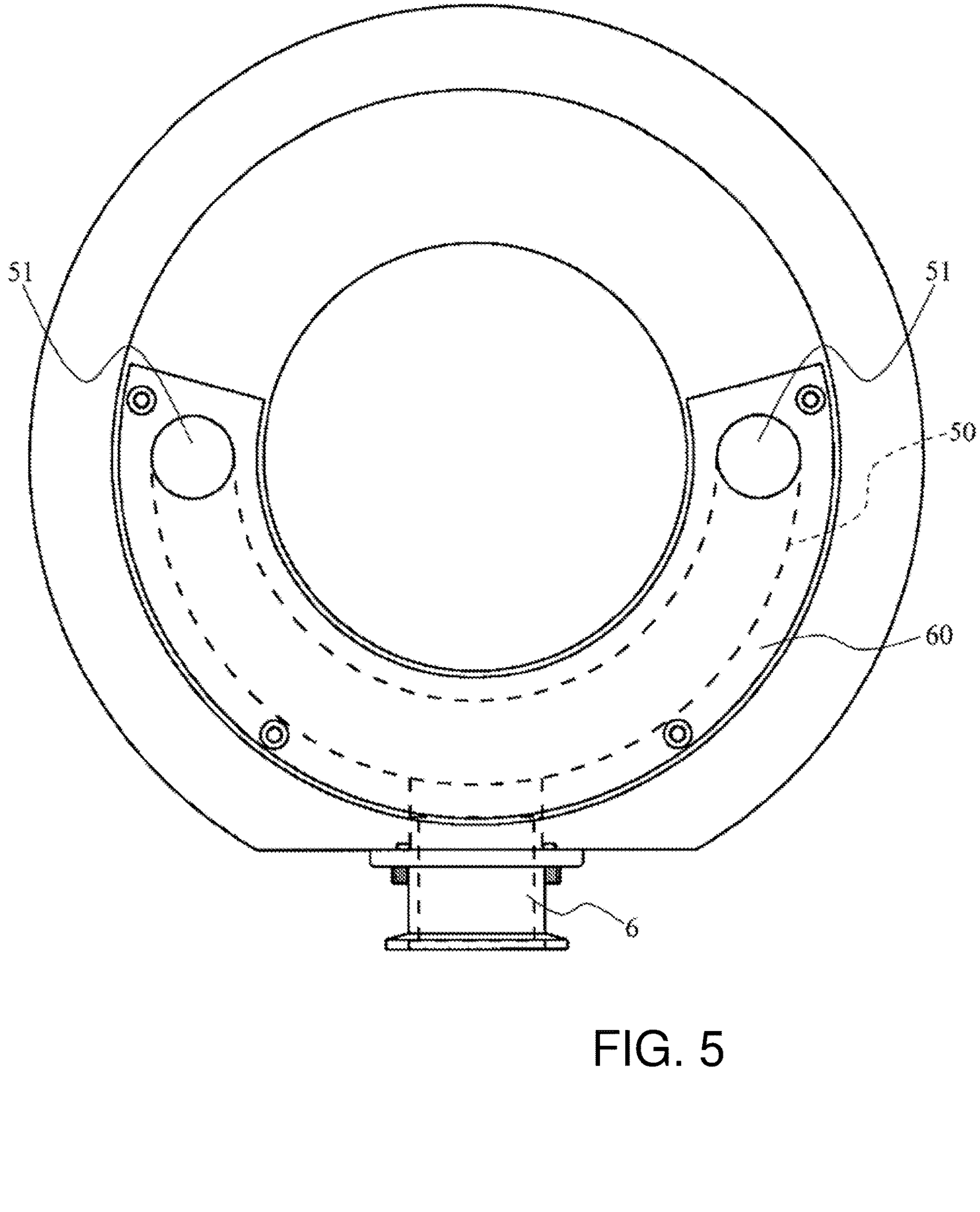
FIG. 5 is a plan view illustrating the vacuum pump (after the lid is installed) according to the embodiment with an exhaust path improved of the present invention.
Figure 6:
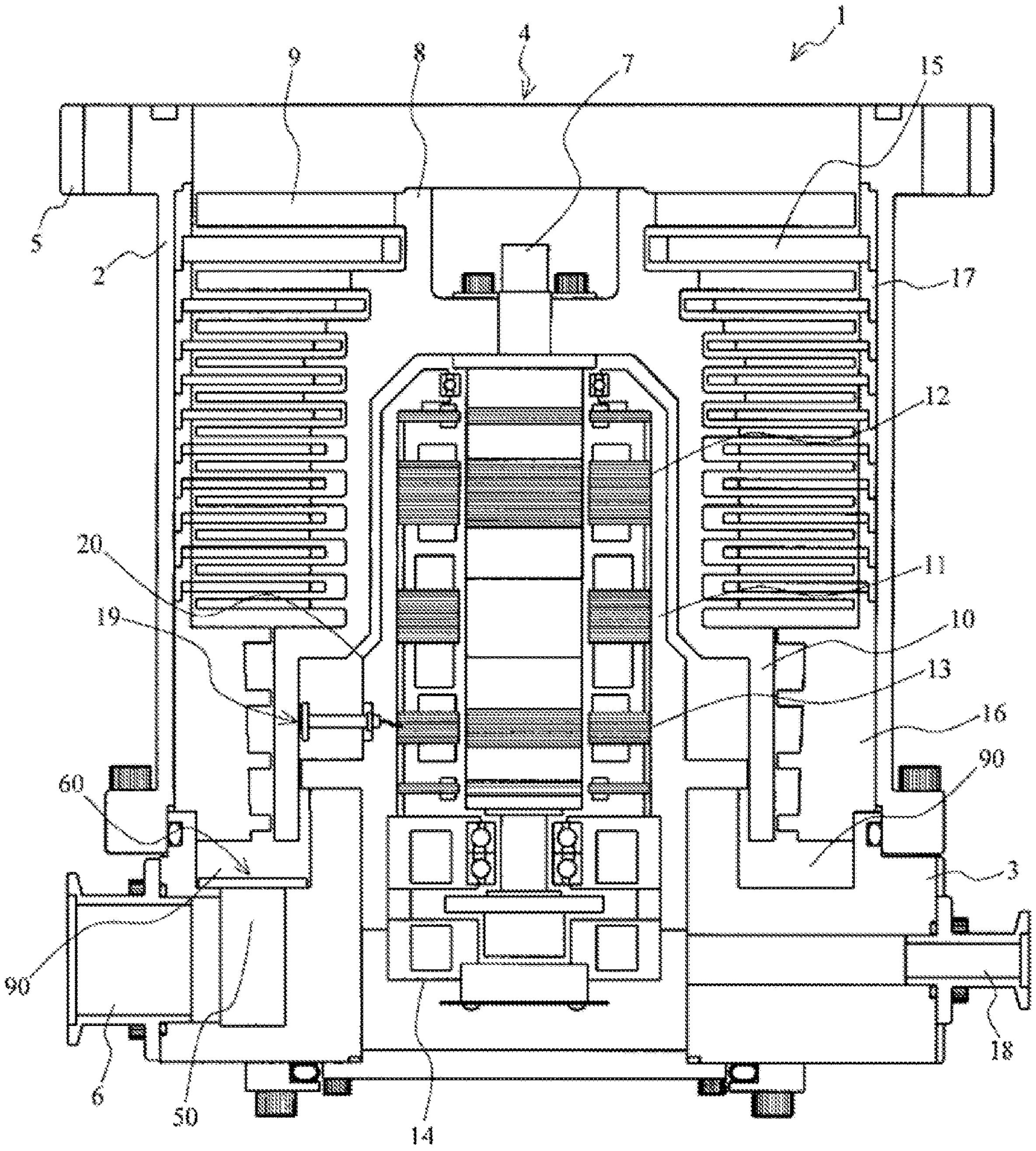
FIG. 6 is a diagram illustrating a schematic configuration example of the vacuum pump according to the embodiment with an exhaust path improved of the present invention.
Figure 7:
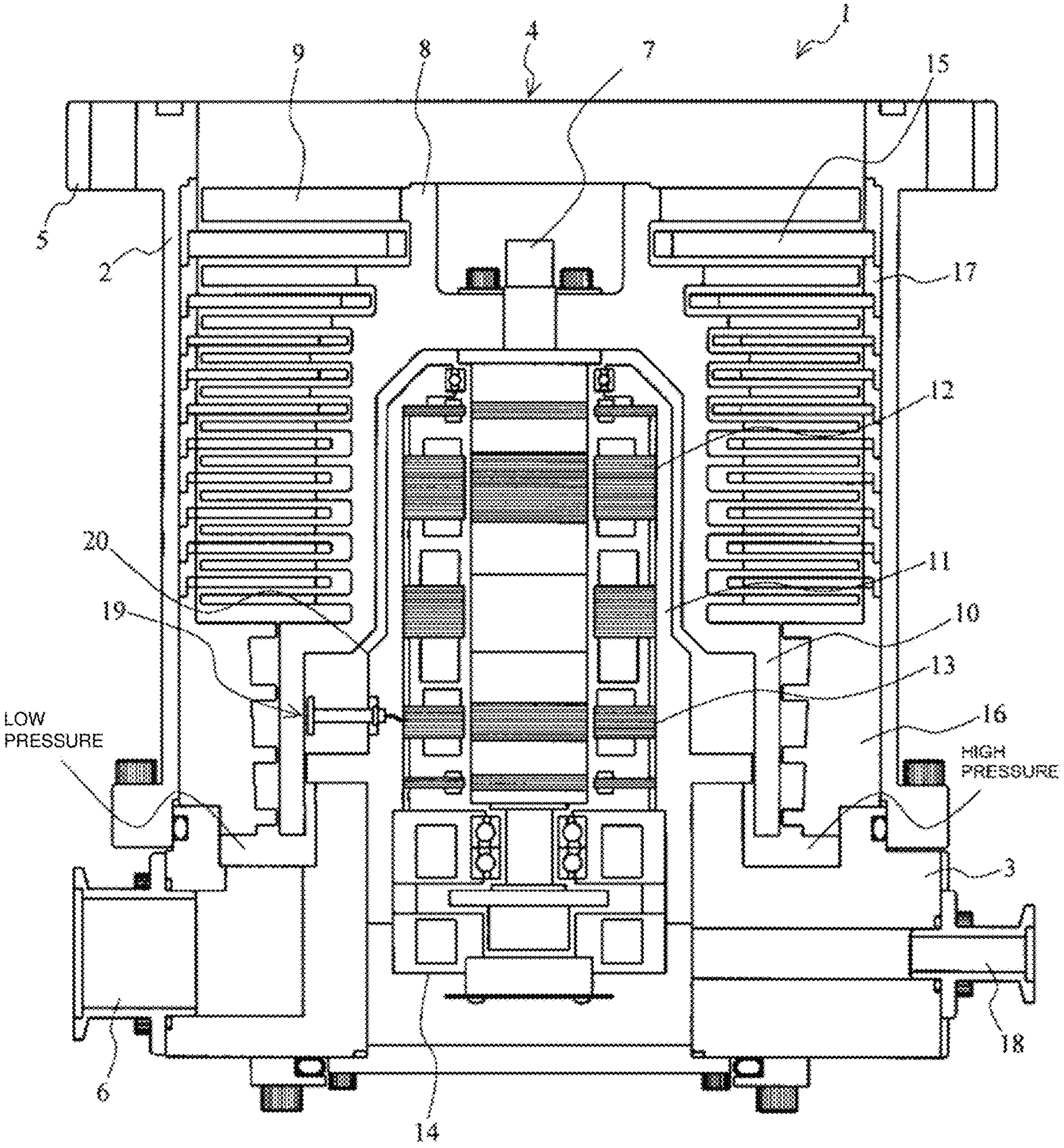
FIG. 7(Prior Art)
FIG. 7 is a diagram for explaining a vacuum pump according to a conventional art.

(ii) As shown in FIG. 4 to FIG. 6, an entrance 51 of an exhaust path is provided one each at positions with a phase shifted by 90 degrees in left-right with respect to an outlet port 6 and moreover, an exhaust path connecting the two entrances 51 of the exhaust path and the outlet port 6 is provided.

As a result, a distance from a terminal end of the exhaust mechanism to the entrance of the outlet port 6 is reduced by half, and the pressure difference generated by exhaust resistance from the terminal end of the exhaust mechanism to the entrance of the outlet port 6 is reduced by half.

On an upper surface of a base 3, by providing a circumferentially extending groove, and by installing a lid 60 open only to both ends thereof, the exhaust path connecting the two entrances and the outlet port can be formed easily.

(2) Details of Embodiments

The preferred embodiments of the present invention will be described below in detail by referring to FIG. 1 to FIG. 6.

Configuration of Vacuum Pump 1

First, configuration of a vacuum pump 1 according to this embodiment will be described.

FIG. 1 is a diagram for explaining the vacuum pump 1 according to a first embodiment of the present invention and is a diagram illustrating a section in an axis direction of the vacuum pump 1.

The vacuum pump 1 of this embodiment is a so-called complex-type molecular pump including a turbo-molecular pump portion and a thread-groove pump portion. However, this embodiment can be also applied to the vacuum pump not including the thread-groove pump portion.

A casing 2 forming a part of a housing of the vacuum pump 1 has a substantially cylindrical shape and constitutes the housing of the vacuum pump 1 together with the base 3 provided on a lower part (on an outlet port 6 side) of the casing 2. Inside the housing of this vacuum pump 1, a gas transfer mechanism, which is a structure for allowing the vacuum pump 1 to exert an exhaust function, is accommodated.

This gas transfer mechanism is constituted roughly by a rotating portion rotatably supported and a stator portion fixed to the housing of the vacuum pump 1.

In an end portion of the casing 2, an inlet port 4 for introducing a gas into the vacuum pump 1 is formed. The vacuum pump 1 introduces (sucks) the process gas from here.

Moreover, on an end surface on the inlet port 4 side of the casing 2, a flange portion 5 extending to an outer peripheral side is formed.

In the base 3, the outlet port 6 for exhausting the gas in the vacuum pump 1 is formed.

The rotating portion is constituted by a shaft 7, which is a rotating shaft, a rotor 8 disposed on this shaft 7, a plurality of rotor blades 9 provided on the rotor 8 (inlet port 4 side), a rotating cylindrical body 10 (outlet port 6 side) and the like. Note that a rotor portion is constituted by the shaft 7 and the rotor 8.

The rotor blade 9 is constituted by a plurality of blades extending radially from the shaft 7 with inclination only by a predetermined angle from a plane perpendicular to an axis of the shaft 7.

Moreover, the rotating cylindrical body 10 is located on a downstream side of the rotor blade 9 and is constituted by a cylindrical member having a cylindrical shape concentrical with a rotating axis of the rotor 8.

In this embodiment, the downstream side in this rotating cylindrical body 10 is a target to be measured for a temperature sensor unit 19 to measure a temperature.

Approximately in the middle in the axis direction of the shaft 7, a motor portion 11 for rotating the shaft 7 at a high speed is provided.

Furthermore, on the inlet port 4 side and the outlet port 6 side of the shaft 7 with respect to the motor portion 11, radial magnetic-bearing devices 12, 13 for supporting the shaft 7 in a radial direction (radial direction) in a non-contact manner are provided, and on a lower end of the shaft 7, an axial magnetic-bearing device 14 for supporting the shaft 7 in an axis direction (axial direction) in the non-contact manner is provided, respectively, and are enclosed by the stator column 20

On an outer diameter part of the stator column 20 and on the outlet port 6 side, a temperature sensor unit 19 for measuring a temperature of the rotating portion is disposed.

The temperature sensor unit 19 is constituted by a disc-shaped heat receiving portion (that is, a temperature sensor portion), a mounting portion fixed to the stator column 20, and a cylindrical insulation portion connecting the heat receiving portion and the mounting portion. The heat receiving portion preferably has a sectional area as large as possible in order to detect heat transfer from the rotating cylindrical body 10 (rotating portion), which is a target to be measured. And it is disposed so as to oppose the rotating cylindrical body 10 through a gap.

Note that an installation position of this temperature sensor unit 19 is not limited to the outlet port 6 side but may be any spot where the purge gas flows.

Note that, in this embodiment, the heat receiving portion is constituted by aluminum, and the insulation portion by a resin, but it is not limiting, and the heat receiving portion and the insulation portion may have such constitution that they are formed integrally by a resin.

Moreover, it may be constituted such that a second temperature sensor portion is disposed on the insulating portion, the mounting portion or the stator column 20, and a temperature of the target to be measured (rotating portion) is presumed by using a temperature difference between this second temperature sensor portion and the temperature sensor portion (first temperature sensor portion) disposed on the aforementioned heat receiving portion.

On an inner peripheral side of the housing (casing 2) of the vacuum pump 1, a stator portion (stator cylinder portion) is formed. This stator portion is constituted by a stator blade 15 provided on the inlet port 4 side (turbo-molecular pump portion), a thread-groove spacer 16 (thread-groove pump portion) provided on the inner peripheral surface of the casing 2 and the like.

The stator blade 15 is constituted by a blade extending with inclination only by a predetermined angle from a plane perpendicular to the axis of the shaft 7 from the inner peripheral surface of the housing of the vacuum pump 1 toward the shaft 7. The stator blades 15 on each stage are separated from each other by a spacer 17 having a cylindrical shape.

In the vacuum pump 1, the stator blades 15 are formed in plural stages in the axis direction alternately with the rotor blades 9.

In the thread-groove spacer 16, a spiral groove is formed on an opposed surface to the rotating cylindrical body 10. The thread-groove spacer 16 is constituted so as to oppose the outer peripheral surface of the rotating cylindrical body 10 with a predetermined clearance (gap) between them. A direction of the spiral grove formed in the thread-groove spacer 16 is a direction toward the outlet port 6 when the gas is transported in a rotating direction of the rotor 8 in the spiral groove.

Note that the spiral groove only needs to be provided at least on either one of the opposed surfaces on the rotating portion side and the stator portion side.

Moreover, a depth of the spiral groove is constituted to become shallower as it gets closer to the outlet port 6 and thus, the gas transported through the spiral groove is gradually compressed as it gets closer to the outlet port 6.

Moreover, a purge port 18 is provided in the outer peripheral surface of the base 3. The purge port 18 communicates with an internal region (that is, an electric component accommodating portion) of the base 3 through a purge-gas channel. The purge-gas channel is a penetrating lateral hole formed by penetrating along the radial direction from an outer-peripheral wall surface to an inner-peripheral wall surface of the base 3 and functions as a purge-gas supply path to send the purge gas supplied from the purge port 18 to the electric component accommodating portion.

Note that this purge port 18 is connected to a gas supply device via a valve.

Here, a flow of the purge gas will be described. The purge gas supplied from the purge port 18 is introduced into the base 3 and the stator column 20. And it moves to an upper part side of the shaft 7 through a space between the motor portion 11, the radial magnetic-bearing devices 12, 13, and the rotor 8 and the stator column 20. Moreover, it is sent to the outlet port 6 through a space between the inner peripheral surfaces of the stator column 20 and the rotor 8 and is exhausted together with a taken-in gas (gas used as a process gas) to outside of the vacuum pump 1 through the inlet port 4.

By means of the vacuum pump 1 constituted as above, vacuum exhaustion processing in a vacuum chamber (vacuum vessel), not shown, disposed in the vacuum pump 1 is performed. The vacuum chamber is a vacuum device used as a chamber and the like of a surface analysis device and a micromachining device, for example.

Here, the purge gas will be described.

The purge gas is introduced from the purge-gas supply device outside, not shown, into the vacuum pump through the purge port 18. This purge-gas supply device controls a flow rate so that the purge gas to be supplied to the vacuum pump 1 has an appropriate amount and is connected to the purge port 18 of the vacuum pump 1 via a predetermined valve.

Here, the purge gas is an inactive gas such as a nitrogen gas (N2), an argon gas (Ar) and the like. By supplying the purge gas to the electric-component accommodating portion, the electric components are protected from an erosive gas (gas used as the process gas) which might be contained in a gas exhausted from the vacuum vessel to which the vacuum pump 1 is connected. That is, this purge gas acts to sweep away the process gas to the outside. For that purpose, in the case where the purge gas is introduced, a 100% state without any impurities mixed in the purge gas is preferably created inside the vacuum pump as much as possible.

Moreover, when a temperature of the rotor blade is to be measured by the temperature sensor unit 19, too, a 100% purge-gas atmosphere is preferable for stable and accurate measurement. Thus, it is important to keep a gas in the periphery of the temperature sensor unit 19 in an appropriately controlled state. In the following embodiment, the purge gas will be described by using a nitrogen gas which has relatively good heat conductivity and is inexpensive as an example.

Subsequently, the first annular gas channel and the second annular gas channel according to this embodiment will be described.

Here, the first annular gas channel 90 is, as shown in FIG. 1 and FIG. 2, an annular channel which allows an exit of the thread-groove spacer 16 and the outlet port 6 to communicate with each other. The compressed process gas and purge gas are exhausted to the outside of the vacuum pump 1 through this channel.

The second annular gas channel 80 is a groove-shaped gas channel in the circumferential direction formed with the partition walls X, Y (vertically two spots) from the outer peripheral surface of the stator column 20 toward the rotating body.

The gas exhausted from the thread-groove exhaust mechanism goes half around this first annular gas channel 90 and is exhausted through the outlet port 6, but if the sectional area of this first annular gas channel 90 is not sufficient and has large resistance, a pressure difference is generated between the outlet port 6 side and the side opposite thereto. A pressure in a surrounded spot A in FIG. 1 and the first annular gas channel 90 becomes low, while the pressure in a surrounded spot B and the first annular gas channel 90 corresponding thereto becomes high.

When such a pressure difference is generated, and the purge gas flows only to one of them, the process gas cannot be swept away by a rapid flow of the purge gas, and an atmosphere of the nitrogen gas (N2) in the periphery of the temperature sensor unit 19, for example, cannot be created.

Thus, by changing the sectional area of this second annular gas channel 80 in the circumferential direction, the pressure of the gas flowing through the channel is changed so that appropriate control is realized.

For example, by widening the sectional area in the vicinity of the outlet port 6 and by narrowing the opposite side, the pressure in the channel can be made low in the vicinity of the outlet port 6 and high on the opposite side.

As a result, since the pressure difference between the front and the rear of the partition wall on the downstream side can be made uniform regardless of the location, the flowrate of the gas passing through the gap between the partition wall on the downstream side and the inner peripheral surface of the rotor blade can be made uniform regardless of the location. By constituting as above, such a phenomenon that the gas flows only to one side can be relaxed.

In the first embodiment shown in FIG. 1, by changing the depth of this second annular gas channel 80 (groove) in the circumferential direction, the sectional area in the vicinity of the outlet port 6 is widened, while the opposite side is narrowed.

On the other hand, in the second embodiment shown in FIG. 2, by changing the interval (widths) of the partition walls X, Y in the circumferential direction, the sectional area in the vicinity of the outlet port 6 is widened, while the opposite side is narrowed.

In the first embodiment shown in FIG. 1, since a surface where the gas is in contact with the rotor blade can be taken wide, it has a merit that a dragging force for circulating the gas can be obtained easily.

On the other hand, in the second embodiment shown in FIG. 2, though the dragging force for circulating the gas is poor, the pressure in the channel is high and a width of the throttle portion can be taken wide for sealing the gas on the opposite side of the outlet port 6 and thus, the backflow of the process gas through the partition wall on the downstream side can be effectively prevented.

Subsequently, a third embodiment will be described by referring to FIG. 3.

Figure 3:
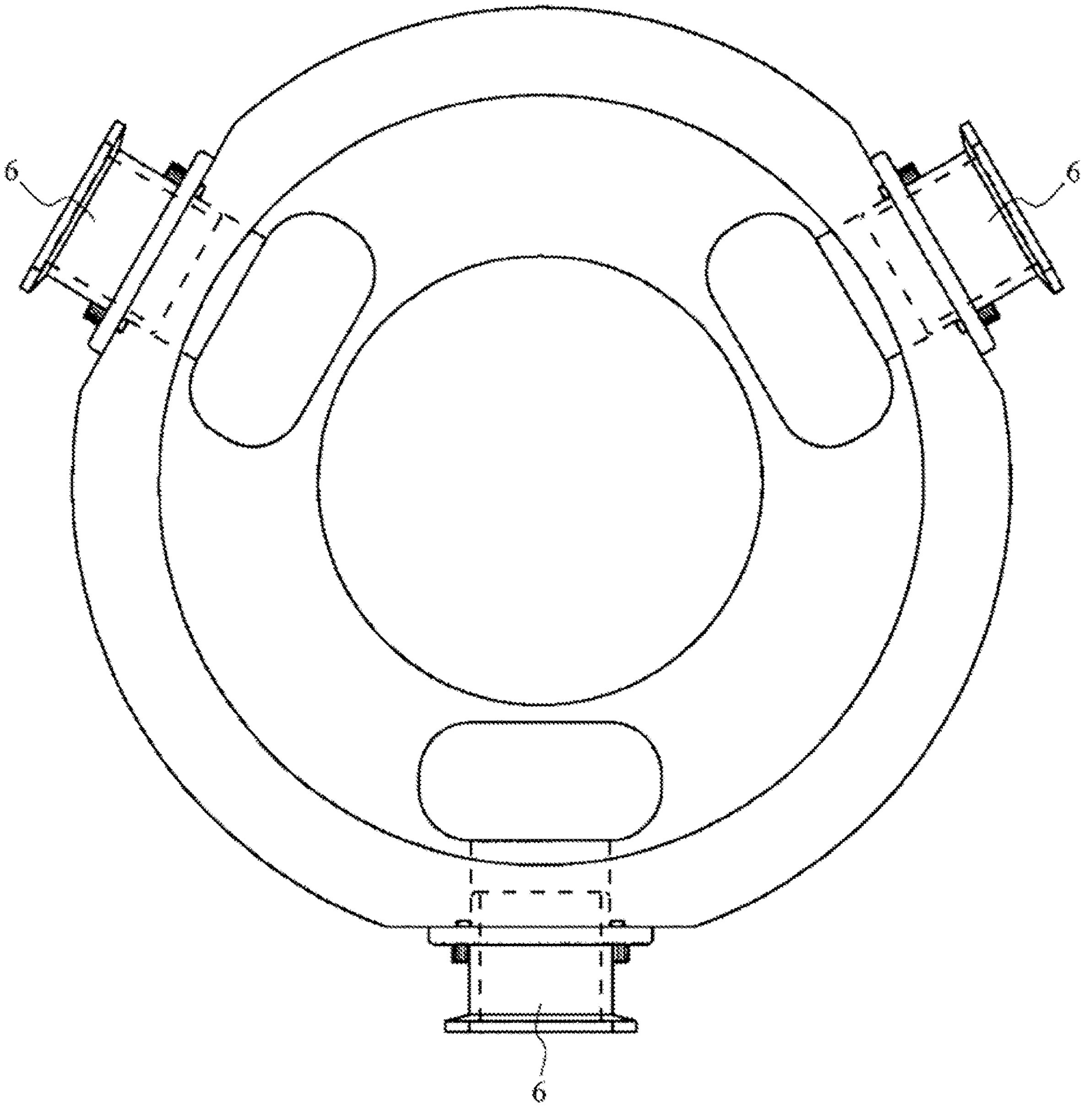
FIG. 3 is a plan view illustrating the vacuum pump according to the embodiment with the number of outlet ports increased of the present invention.

FIG. 3 is a plan view illustrating the vacuum pump according to the embodiment in which the number of outlets is increased.

The pressure difference is generated in the second annular gas channel 80 because there is a difference in distance to the outlet port 6 between the outlet port 6 and the opposite side thereof. Thus, by increasing the number of the outlet ports 6, this difference in the distance can be reduced, and the pressure difference can be also relaxed.

For example, by providing the outlet port 6 also at an opposed position, the second annular gas channel 80 which causes the pressure difference becomes a ¼ round and thus, the pressure difference can be reduced by half as compared with the case of the outlet port 6 at one spot.

In the example shown in FIG. 3, since the outlet ports 6 are provided at three spots, the pressure difference can be reduced to ⅓ as compared with the case of the outlet port 6 at one spot.

There is no particularly limit to the number of the outlet ports 6 but can be determined as appropriate by considering manufacturing costs and labor of connection at the site and the like.

Subsequently, by referring to FIG. 4 to FIG. 6, a fourth embodiment will be described.

As shown in FIG. 4 and FIG. 5, the entrance 51 of the exhaust path is provided one each at positions with a phase shifted by 90 degrees in left-right with respect to the outlet port 6 and moreover, an exhaust path connecting the two entrances 51 of the exhaust path and the outlet port 6 is provided.

As a result, a distance from the terminal end of the exhaust mechanism to the entrance of the outlet port 6 is reduced by half, and the pressure difference generated by exhaust resistance from the terminal end of the exhaust mechanism to the entrance of the outlet port 6 can be reduced.

On the upper surface of the base 3, a groove 50 of the exhaust path extending in the circumferential state is provided, and a lid 60 open only to both ends thereof is installed, whereby the exhaust path connecting the two entrances of the exhaust path and the outlet port 6 can be formed easily. Note that the lid 60 is a semi-circular plate.

In the aforementioned first embodiment to fourth embodiment, by relaxing the pressure difference generated in the annular gas channel, the flow of the purge gas to be introduced is appropriately controlled, and the function specific to the purge gas can be exerted sufficiently.

Thus, by creating the atmosphere close to 100% purge-gas in the periphery of the temperature sensor unit 19, the temperature can be measured accurately. As a result, a creep phenomenon of the rotor blade caused by overheat can be prevented.

Moreover, the process gas can be exhausted through the outlet port 6 by the flow of the purge gas, and intrusion of the process gas into the vacuum pump 1, which causes deposition of products on the rotor blade, for example, can be prevented.

Note that the embodiments and each of the variations of the present invention may be constituted to be combined as necessary. The first embodiment and the third embodiment may be constituted to be used at the same time, for example.

Moreover, it is natural that the present invention can be altered in various ways as long as the spirit of the present invention is not departed and that the present invention is also applied to the altered ones.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump comprising:

a housing in which an outlet port for exhausting a gas is formed;

a stator column enclosed in the housing and surrounding various electric components;

inside the housing, a rotating shaft rotatably supported;

a rotating body fixed to the rotating shaft, disposed outside the stator column and rotating with the rotating shaft;

a stator portion disposed opposite to the rotating body with a predetermined gap; and an exhaust mechanism for exhausting the gas by mutual actions of the rotating body which is rotated and the stator portion, wherein a first annular gas channel allowing the outlet port and an exit of the exhaust mechanism to communicate with each other is provided;

a second annular gas channel formed by two partition walls formed from an outer peripheral surface of the stator column toward the rotating body is provided, and a sectional area of the second annular gas channel is formed larger in the vicinity of the outlet port and smaller on an opposite side.

2. The vacuum pump according to claim 1, wherein by changing a width in a radial direction of the second annular gas channel, the sectional area of the second annular gas channel is formed larger in the vicinity of the outlet port and smaller on the opposite side.

3. The vacuum pump according to claim 1, wherein by changing a width in a center axis direction of the second annular gas channel, the sectional area of the second annular gas channel is formed larger in the vicinity of the outlet port and smaller on the opposite side.

4. The vacuum pump according to claim 1, wherein a plurality of outlet ports from the first annular gas channel are provided.

5. The vacuum pump according to claim 1, wherein an exit to the first annular gas channel of the exhaust mechanism is constituted by a groove extended in a circumferential direction.

6. The vacuum pump according to claim 1, wherein a partition wall which separates the outlet port side from the exit side of the exhaust mechanism is provided in the first annular gas channel, and a plurality of holes which allow the outlet port side and the exit side of the exhaust mechanism to communicate with each other are provided in the partition wall in the first annular gas channel.

7. The vacuum pump according to claim 1, wherein on an upstream side in an exhaust direction, a temperature sensor is provided on the stator column.

* * * * *